United States Patent
Blomqvist et al.

(10) Patent No.: US 12,035,692 B2
(45) Date of Patent: Jul. 16, 2024

(54) ANIMAL MONITORING DEVICE AND RELATED METHODS FOR MONITORING AN ANIMAL

(71) Applicant: Sony Group Corporation, Tokyo (JP)

(72) Inventors: Peter Blomqvist, Basingstoke (GB); Peter Exner, Bjärred (SE); Hannes Bergkvist, Rydebäck (SE)

(73) Assignee: Sony Group Corporation, Tokyo (JP)

( * ) Notice: Subject to any disclaimer, the term of this patent is extended or adjusted under 35 U.S.C. 154(b) by 307 days.

(21) Appl. No.: 17/683,024

(22) Filed: Feb. 28, 2022

(65) Prior Publication Data

US 2022/0295752 A1 Sep. 22, 2022

(30) Foreign Application Priority Data

Mar. 22, 2021 (SE) .................................. 2150329-7

(51) Int. Cl.
  *A01K 29/00* (2006.01)
  *H04W 4/80* (2018.01)

(52) U.S. Cl.
  CPC ............. *A01K 29/005* (2013.01); *H04W 4/80* (2018.02)

(58) Field of Classification Search
  CPC .. A01K 29/005; A01K 11/004; A01K 11/006; H04W 4/80; H04W 4/38; H04W 52/0229; H04W 76/14; H04W 88/04; H04L 67/12; H04L 67/125
  USPC ............................................ 340/539.1, 573.3
  See application file for complete search history.

(56) References Cited

U.S. PATENT DOCUMENTS

| | | | |
|---|---|---|---|
| 8,674,807 B2 * | 3/2014 | Lauronen | H04W 52/0245 340/10.5 |
| 9,538,729 B2 | 1/2017 | Yarden | |
| 10,356,721 B1 | 7/2019 | Arora et al. | |
| 10,834,549 B2 | 11/2020 | Elkhail et al. | |
| 2015/0349917 A1 * | 12/2015 | Skaaksrud | H04W 52/40 370/328 |
| 2016/0174099 A1 * | 6/2016 | Goldfain | A61B 5/6831 375/130 |
| 2017/0094579 A1 | 3/2017 | Kurihara et al. | |
| 2018/0146645 A1 * | 5/2018 | Arbel | A01K 11/006 |
| 2019/0387711 A1 * | 12/2019 | Flennert | A01K 29/005 |
| 2020/0289032 A1 * | 9/2020 | Makarychev | A61B 5/747 |

FOREIGN PATENT DOCUMENTS

| | | | | |
|---|---|---|---|---|
| CN | 210746677 U | 6/2020 | | |
| DE | 10045469 A1 | 4/2002 | | |
| KR | 20190139611 A | * 12/2019 | ........... | A01K 29/005 |
| KR | 20190139611 A | 12/2019 | | |
| WO | 2007073344 A1 | 6/2007 | | |

OTHER PUBLICATIONS

Office Action and Search Report from corresponding Swedish Application No. 2150329-7, mailed on Nov. 10, 2021, 11 pages.

* cited by examiner

*Primary Examiner* — Adnan Aziz

(74) *Attorney, Agent, or Firm* — Tucker Ellis LLP

(57) ABSTRACT

An animal monitoring device includes memory circuitry, interface circuitry configured to communicate via short-range wireless communication to a second animal monitoring device and via cellular communication, and processor circuitry configured to obtain, from a first sensor, sensor data having a first transmission deadline and provide the sensor data into a sensor data set.

20 Claims, 6 Drawing Sheets

ANIMAL MONITORING DEVICE AND RELATED METHODS FOR MONITORING AN ANIMAL

CROSS REFERENCE TO RELATED APPLICATIONS

The present application claims priority to Swedish Patent Application No. 2150329-7, filed Mar. 22, 2021, the content of which is incorporated herein by reference in its entirety.

TECHNICAL FIELD

The present disclosure pertains generally to the field of Internet-of-Things and monitoring, and more specifically animal monitoring. The present disclosure relates to an animal monitoring device and related methods.

BACKGROUND

An approach to tracking and monitoring an animal, such as livestock like cattle, has typically involved continuous reporting to a server that is remotely located. Each animal is equipped with a unit that can sense and communicate vital information that is needed for owners or caretakers, such as farmers to care of their herd. It is important that information can reach a server in a timely manner where it can be further analyzed. In the case of cattle farming, when the animals graze over vast areas, communication over long distances to report to a remote server becomes challenging.

SUMMARY

Accordingly, there is a need for animal monitoring devices and methods, which may mitigate, alleviate or address the shortcomings existing and may reduce power consumption in the monitoring of one or more animals.

A animal monitoring device is disclosed. The animal monitoring device can include memory circuitry.

The animal monitoring device comprises interface circuitry configured to communicate via short-range wireless communication to a second animal monitoring device and cellular communication.

The animal monitoring device comprises processor circuitry configured to obtain, from a first sensor, sensor data having a first transmission deadline and provide the sensor data into a sensor data set.

The animal monitoring device can be configured to receive, from the second animal monitoring device, a second battery parameter indicative of battery level of the second animal monitoring device, when the animal monitoring device is in range, using the short-range wireless communication, with the second animal monitoring device.

The animal monitoring device can be configured to determine if the second battery parameter satisfies a first criterion based on a first battery parameter indicative of battery level of the animal monitoring device, when the animal monitoring device is in range with the second animal monitoring device.

The animal monitoring device can be configured to, when the second battery parameter satisfies the first criterion, receive, via the short-range wireless communication, from the second animal monitoring device, second sensor data having a second transmission deadline and add the second sensor data into the sensor data set.

The animal monitoring device can be configured to, when the second battery parameter does not satisfy the first criterion, transmit data in the sensor data set via short-range wireless communication to the second animal monitoring device.

The animal monitoring device can be configured to, control the transmission, via the cellular communication, of data in the sensor data set based on the first transmission deadline or the second transmission deadline.

Disclosed is a method, performed by an animal monitoring device, for monitoring an animal. The method comprises obtaining, from a first sensor, sensor data having a first transmission deadline and providing the sensor data into a sensor data set. The method can comprise receiving, from the second animal monitoring device, a second battery parameter indicative of battery level of the second animal monitoring device when the animal monitoring device is in range, using the short-range wireless communication, with a second animal monitoring device. The method can comprise determining if the second battery parameter satisfies a first criterion based on a first battery parameter indicative of battery level of the animal monitoring device when the animal monitoring device is in range with a second animal monitoring device. The method can comprise, when the second battery parameter satisfies the first criterion, receiving, via a short-range wireless communication of the animal monitoring device, from the second animal monitoring device, second sensor data having a second transmission deadline and adding the second sensor data into the sensor data set. The method can comprise, when the second battery parameter does not satisfy the first criterion, transmitting data in the sensor data set via the short-range wireless communication to the second animal monitoring device. The method can comprise controlling the transmission, via a cellular communication of the animal monitoring device, of data in the sensor data set based on the first transmission deadline or the second transmission deadline.

It is an advantage of the present disclosure that power and/or energy efficiency of the transmission of sensor data regarding an animal may be improved. Advantageously, the disclosed devices and methods can greatly increase the power efficiency of communicating data between animal monitoring devices and/or to a receiver, such as an external device, such as a server device. This can be particularly advantageous for animals that have large separations from one another and with requirements that data from each of the animal monitoring devices be transmitted to a server device. The disclosed technique may reduce the cost of network formation, for example in that peer-to-peer connections are established. The disclosed technique may be seen as avoiding routing, for example in that packets are transferred from animal monitoring device to animal monitoring device. Moreover, the disclosed devices and methods can reduce the costs of monitoring animals, such as groups of animals, such as by avoiding expensive solutions such as ad-hoc network formation/re-formation with mobile nodes.

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1A:
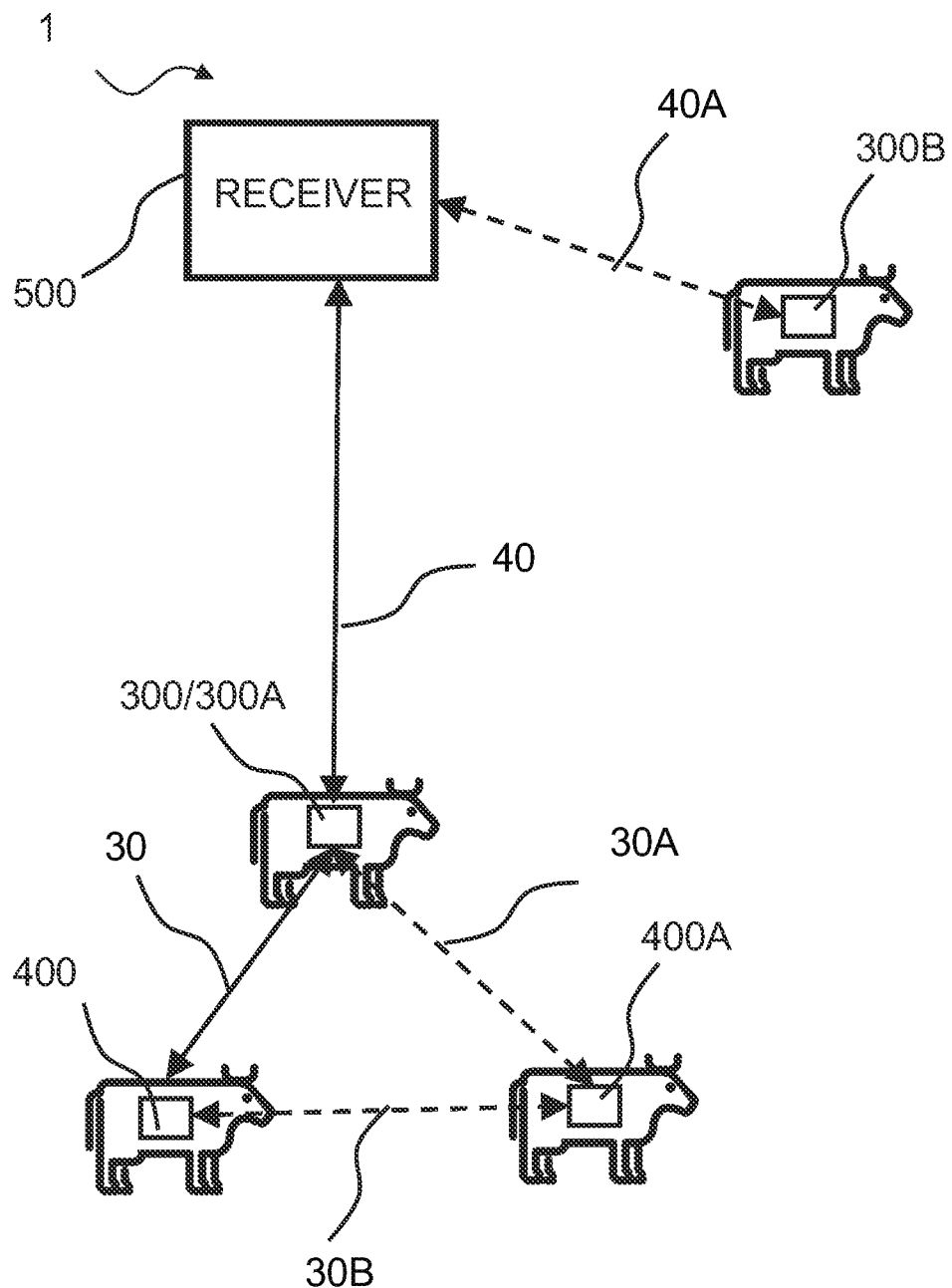
FIGS. 1A-1B are diagrams illustrating an example animal monitoring device and associated data communication.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

Disclosed herein are devices, systems, assemblies, and/or methods for monitoring one or more animals. The one or more animals can be livestock. The one or more animals can be, for example, cows, sheep, goats, chickens, dogs, and/or cats. The animals can be the same type of animal. The animals can be different types of animals. The animals can be humans. The particular animal is not limiting. Each animal may have an animal monitoring device associated with it.

The monitored animals can spread out over long distances, and may be a long distance from a receiver (such as an external device, such as a server device) configured to receive data from the animal monitoring devices. Therefore, there can be a need to perform long distance data transfers. Cellular communication is one radio technology that can transport data over long distances. However, cellular communication runs on high power, and thus can be expensive and/or wasteful to maintain.

An alternative to cellular communication is short-range wireless communication, that uses a magnitude less power than cellular communication. However, short-range wireless communication will unlikely cover large areas or long distances, such as with free moving herds, or other groupings, of animals.

One approach to covering large groups of animals is to establish a mesh network. However, mesh networks are costly to form and costly to rebuild as animals move around. Rebuilding requires tasks such as discovery, joining, and propagation of routing tables each time an animal joins/leaves the network.

One or more example animal monitoring devices disclosed herein can be configured so that data can be transferred efficiently and transmitted from animal monitoring devices associated with a group of animals without the high costs associated with expensive mesh networking or the necessity of always transmitting using cellular communication. As will be discussed herein, it can be more efficient to collect and transmit large chunks of data. Transmission time can then be decided for example from priority or message age, and additionally adapted based on transmission (Tx) conditions, such as indoor vs. outdoor.

Specifically, embodiments of the disclosure provide for animal monitoring devices which can utilize short-range wireless communication to reduce overall power consumption (and/or energy consumption, and/or battery consumption). This type of communication can utilize peer-to-peer communication for short-range, and low-power consumption. Accordingly, each animal monitoring device can act as nodes, and the nodes can be in short-range wireless communication.

Longer range communications, such as cellular communications having high power requirements, can be limited to particular situations and/or times. For example, the disclosure can utilize short-range communication between animal monitoring devices to collect data from all nearby devices, and then only utilize the cellular communication at certain times to send all of the collected data from one of the animal monitoring devices.

Thus, in one or more example animal monitoring devices, the animal monitoring device can utilize short-range wireless communication for communication between near animal monitoring devices. In this way, a particular animal monitoring device can receive data, such as sensor data, from any near animal monitoring devices to consolidate the data in a power efficient manner. Further, the animal monitoring device can utilize cellular communication to pass any data contained in the animal monitoring device, including data received from nearby animal monitoring devices, to a receiver, such as an external device. The receiver can be, for example, a server device, a server, a base station, an antenna, user equipment etc.

In order to avoid delivery timeout of data and/or prevent stale data, the sensor data held within the animal monitoring device can include one or more transmission deadlines. The transmission deadlines can be indicative of a time period in which the data would need to be sent out, such as via the cellular communication. This can avoid delivery timeout, as the data can be sent out via the cellular communication when the earliest transmission deadline is met. Thus, data (such as all or less than all) can be transmitted in proper time due to the transmission deadline. Alternatively, the transmission deadline can be set to infinity if no transmission deadline is needed.

Advantageously, the disclosed animal monitoring devices can be used for groups of animals which may move in and out of short-range wireless communication range. Thus, the animal monitoring devices can allow for reconfiguration of their transmission and/or reception of data based on the grouping of the animals and their animal monitoring devices. However, the animal monitoring device may not be a cluster coordinator and/or be associated with another animal monitoring device acting as a cluster coordinator.

This can significantly reduce the collective power consumption of data transmissions since transmitting larger chunks of data using cellular communication is much more efficient than multiple transmissions of smaller packets. Also, the short-range wireless communication used for accumulating the data uses a magnitude less power than cellular communication.

The short-range wireless communication(s) disclosed herein can be short-range radio wireless communication(s), such as a short-range wireless communication technology, such as using a short-range wireless communication system or network. The short-range wireless communication(s) can be short range radio. The short-range wireless communication(s) can be Bluetooth communication(s), IEEE 802.15 and/or IEEE 802.15.4.

In one or more example, the short-range wireless communication(s) can have a range of 1, 2, 3, 4, 5, 6, 7, 8, 9, 10, 15, 20, 25, 30, 35, 40, 45, 50, 60, 70, 80, 90, or 100 m. In one or more example, the short-range wireless communication(s) can have a range of greater than 1, 2, 3, 4, 5, 6, 7, 8, 9, 10, 15, 20, 25, 30, 35, 40, 45, 50, 60, 70, 80, 90, or 100 m. In one or more example, the short-range wireless communication(s) can have a range of less than 1, 2, 3, 4, 5, 6, 7, 8, 9, 10, 15, 20, 25, 30, 35, 40, 45, 50, 60, 70, 80, 90, or 100 m.

The long-range communication(s) disclosed herein can be cellular communication(s). The cellular communication(s) can be a wireless communication technology, such as a cellular wireless communication technology, such as using a cellular communication system or network. The cellular communication(s) can include communications using a 3$^{rd}$ Generation Partnership Project, 3GPP, system. The cellular communication(s) can be Long Term Evolution, LTE. The cellular communication(s) can be 5G. The cellular communication(s) can be New Radio, NR. The cellular communication(s) can be Cat-M1, for example in 5G. The cellular communication(s) can be Narrow-Band Internet-of-things, NB-IoT. The long-range communication(s) disclosed herein can be a wireless communication suitable for IoT networks, such as a low power wide area wireless communication, for example with robust long-distance communication.

In one or more example, the cellular communication(s) can have a range of 1, 2, 3, 4, 5, 6, 7, 8, 9, 10, 15, 20, 25, 30, 35, 40, 45, 50, 60, 70, 80, 90, or 100 km. In one or more example, the cellular communication(s) can have a range of greater than 1, 2, 3, 4, 5, 6, 7, 8, 9, 10, 15, 20, 25, 30, 35, 40, 45, 50, 60, 70, 80, 90, or 100 km. In one or more example, the cellular communication(s) can have a range of less than 1, 2, 3, 4, 5, 6, 7, 8, 9, 10, 15, 20, 25, 30, 35, 40, 45, 50, 60, 70, 80, 90, or 100 km.

In alternative configurations, the animal monitoring device may not be configured for cellular communication and may only use short-range wireless communication. Accordingly, the receiver of the data may be located in a location that the animal monitoring device would come near. For example, the receiver may be at a shelter, salt rock, feeding station, etc. where the animal would typically go.

In one or more examples, the receiver of the data may be remotely located from the animal monitoring device. For example the receiver may be located in a cloud-based network. For example, the receiver may be a server device configured to collect sensor data of a plurality of animals.

The figures are schematic and simplified for clarity, and they merely show details which aid understanding the disclosure, while other details have been left out. Throughout, the same reference numerals are used for identical or corresponding parts.

FIG. 1A is a diagram illustrating an example wireless communication system 1. This can include an example animal monitoring device 300 and/or 300A according to this disclosure. Animal monitoring device 300 is further discussed with respect to FIG. 2 and animal monitoring device 300A is further discussed with respect to FIG. 3.

As shown, an animal monitoring device 300/300A may be associated with a particular animal. FIG. 1A illustrates a cow, though other animals can be used as well. The particular components of the animal monitoring device 300/300A are discussed in detail below. In particular, the animal monitoring device 300/300A may be configured to obtain, such as receive, sensor data about the particular animal that the animal monitoring device 300/300A is associated with. This can include any number of different types of data, as disclosed in detail below. The sensor data can be stored in a sensor data set of the animal monitoring device 300/300A.

As shown, the animal monitoring device 300/300A may come into range, using a short-range wireless communication 30, with a second animal monitoring device 400 associated with a second animal. Once the animal monitoring device 300/300A is in range with the second animal monitoring device 400, the animal monitoring devices 300/300A and 400 may be configured to communicate with one another via the short-range wireless communication 30. In other words, for example, when the animal monitoring devices 300/300A and 400 can communicate with one another via the short-range wireless communication 30, the animal monitoring device 300/300A is determined to be in range with the second animal monitoring device 400. Accordingly, the animal monitoring device 300/300A may be configured to transmit via the short-range wireless communication 30 any data stored in its sensor data set to second animal monitoring device 400. Further, the animal monitoring device 300/300A may be configured to receive via the short-range wireless communication 30 any data stored in a sensor data set of the second animal monitoring device 400.

The transmitting and/or the receiving may occur under certain conditions. For example, the animal monitoring device 300/300A may include a first battery parameter. For example, the animal monitoring device 300/300A may include a battery having a first battery parameter (for example, the battery having the first battery parameter may be denoted as a first battery). The first battery parameter may be based on a battery level of the animal monitoring device 300/300A. Further, the second animal monitoring device 400 may include a second battery parameter. For example, the second animal monitoring device 400 may include a battery having a second battery parameter (for example, the battery having the second battery parameter may be denoted as a second battery). The second battery parameter may be based on a battery level of the second animal monitoring device 400.

Accordingly, the animal monitoring device 300/300A may be configured to determine whether the second battery parameter satisfies a first criterion. The first criterion can be based on the first battery parameter. When the second battery parameter satisfies the first criterion, the animal monitoring device 300/300A is configured to receive, via the short-range wireless communication 30, from the second animal monitoring device 400, second sensor data. The animal monitoring device 300/300A may then add the second sensor data into the sensor data set. FIG. 1A shows the second battery parameter satisfying the first criterion.

However, if the second battery parameter does not satisfy the first criterion, the animal monitoring device 300/300A is configured to transmit the data in the sensor data set via the short-range wireless communication 30 to the second animal monitoring device 400.

The first criterion may be indicative of which animal monitoring device 300/300A or 400 has a higher battery level. It may be advantageous to have the animal monitoring device with the highest battery level collect all of the data of the animal monitoring devices around it. That way, it is the animal monitoring device with the highest battery level performing the high-power cellular communication of the data.

Additionally, the animal monitoring device 300/300A may be in cellular communication 40 with a receiver 500, such as an external device. The receiver may be, for example, a base station and/or antenna and/or wireless receiver and/or cellular receiver and/or receiving device. The communication 40 may be a long range communication. The cellular communication 40 can be, for example, an LTE communication. In particular, the animal monitoring device 300/300A may be configured to control the transmission, via the cellular communication 40, of data in the sensor data set to the receiver 500.

In particular, the animal monitoring device 300/300A may be configured to control the transmission based on transmission deadlines associated with the sensor data. For example, the sensor data of the animal monitoring device 300/300A may have a first transmission deadline. The first transmission deadline can be a time deadline, or countdown. For example, a time deadline can be a scheduled timeslot, such as a specific date and time for transmission of the corresponding sensor data via the cellular communication. For example, when the first transmission deadline reaches 0, the animal monitoring device 300/300A can be configured to transmit the data from the sensor data set via the cellular communication 40.

However, the second sensor data may have a second transmission deadline associated with it. The second transmission deadline may be shorter than the first transmission deadline. Thus, once the animal monitoring device 300/300A receives the second sensor data, with associated second transmission data (indicative of the second transmission deadline), the animal monitoring device 300/300A may organize the data chronologically with respect to transmission deadline(s), for example from the earliest transmission deadline to the latest transmission deadline. Thus, the animal monitoring device 300/300A may be configured to control transmission of all of the data in the sensor data set via the cellular communication 40 based on the earlier of the two transmission deadlines: the first transmission deadline and the second transmission deadline. This can advantageously avoid timeout issues of the data.

For example, a transmission deadline may be set to a time period until transmission of the sensor data via the cellular communication, such as 60 minutes. Once a minute passes, the transmission deadline may then be 59 minutes. Once the transmission deadline reaches 0, this can be indicative that the animal monitoring device 300/300A should transmit the data via the cellular communication 40.

As more sensor data is received by the animal monitoring device 300/300A, more transmission deadlines may be incorporated into the sensor data set. For example, the animal monitoring device 300/300A may optionally be, based on the short-range wireless communication, in range with a third animal monitoring device 400A associated with a third animal. Similar to above, the animal monitoring device 300/300A may be configured to transmit/receive data (such a third battery parameter, such as third sensor data) with respect to the third animal monitoring device 400A. Further, the second animal monitoring device 400 may optionally be configured to transmit/receive data (such a third battery parameter, such as third sensor data) with respect to the third animal monitoring device 400A.

Thus, as shown in FIG. 1A, the animal monitoring device may collect sensor data from itself, from the second animal monitoring device 400, and optionally from the third animal monitoring device 400A for cellular transmission 40 to the receiver 500. By consolidating the sensor data of all the animal monitoring devices 300/300A/400/400A with a single animal monitoring device 300/300A via low power, short-range wireless communication 30/30A/30B before the cellular communication 40, power saving can be achieved.

In some instances, animals can spread apart beyond the short-range wireless communication. This is also shown in FIG. 1A. As shown, another animal monitoring device 300B associated with another animal can be separate from the other animal monitoring devices 300/300A and 400 and 400A. Specifically, the animal having the another animal monitoring device 300B can be at a distance farther than what is reachable via the short-range wireless communication 30/30A/30B. Thus, the another animal monitoring device 300B may be separate from, and not be in short-range communication with, any of the other animal monitoring devices 300/300A/400/400A shown in FIG. 1A.

Accordingly, the another animal monitoring device 300B may optionally have its own cellular communication 40A with the receiver 500. Thus, when a transmission deadline is met for a sensor data set in the another animal monitoring device 300B, it can be configured to transmit the data via the cellular communication 40A separate from animal monitoring device 300/300A.

Figure 1B:
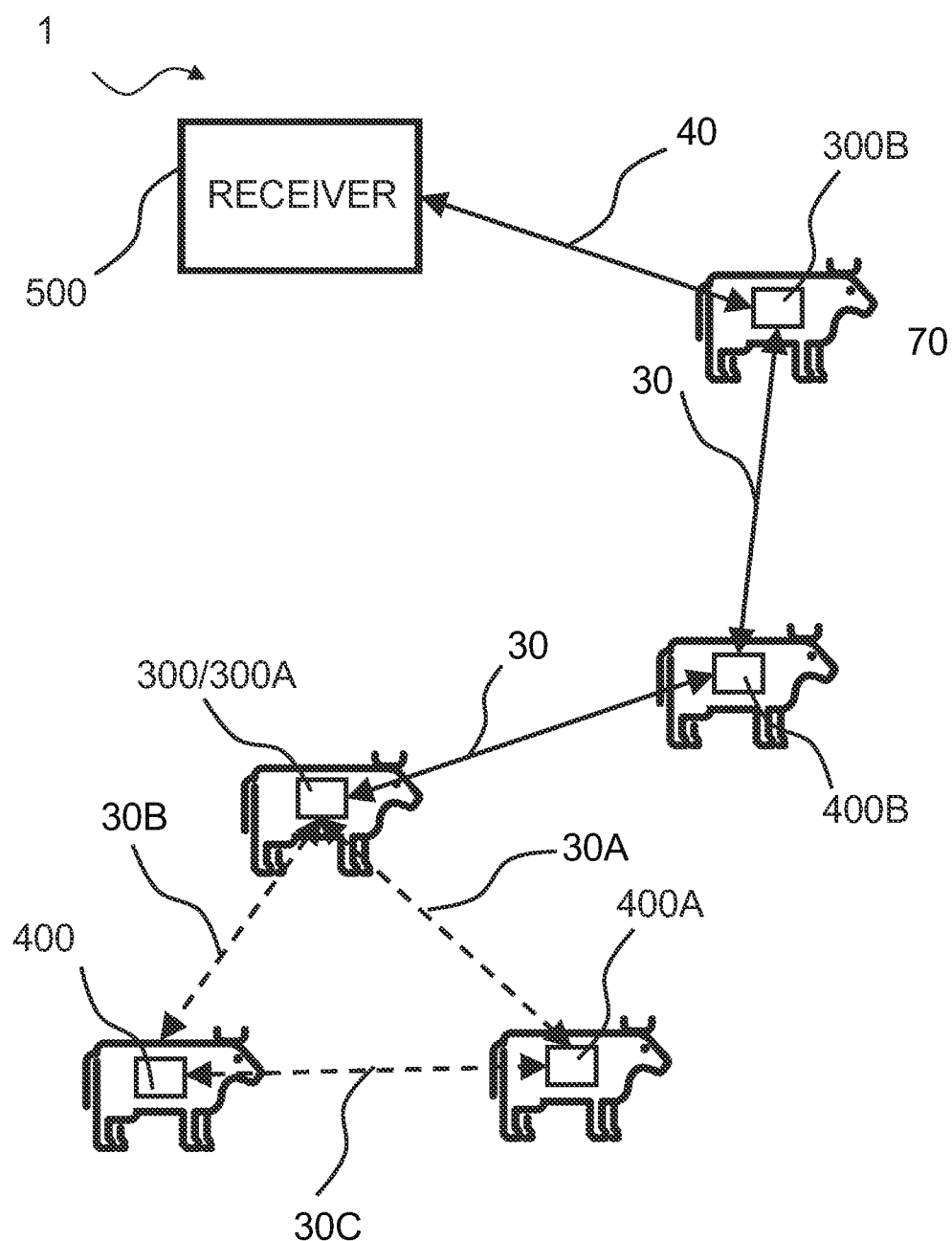

FIG. 1B is a diagram illustrating an example wireless communication system 1 comprising an example animal monitoring device 300/300A according to this disclosure.

FIG. 1B illustrates a similar example animal configuration as FIG. 1A, but now includes a new intermediate animal monitoring device 400B associated with an intermediate animal in between animal monitoring device 300/300A and another animal monitoring device 300B.

The intermediate animal monitoring device 400B is in short-range wireless communication 30 with both the animal monitoring device 300/300A and the another animal monitoring device 300B. Thus, through the short-range wireless communication 30, animal monitoring device 300/300A may be communicable to the another animal monitoring device 300B.

Unlike FIG. 1A, the battery parameter of the animal monitoring device 300/300A satisfies the criterion from the intermediate animal monitoring device 400B. Thus, the intermediate animal monitoring device 400B is configured to receive the sensor data from the animal monitoring device 300/300A. Further, the battery parameter of the intermediate animal monitoring device 400B does not meet the criteria with respect to the another animal monitoring device 300B, and thus the intermediate animal monitoring device 400B can transmit sensor data, including the sensor data from the animal monitoring device 300/300A, to the another animal monitoring device 300B. Once any of the transmission deadlines are met, the another animal monitoring device 300B can transmit data collected in the sensor data set via cellular communication 40 to the receiver 500.

Further, as shown, animal monitoring device 300/300A may still optionally be in short-range wireless communication with other animal monitoring devices it may be in short-range wireless communication with. For example, the animal monitoring device 300/300A may be in short-range wireless communication 30A/30B with one or more of animal monitoring device 400 and animal monitoring device 400A. Further, animal monitoring device 400 may optionally be in short-range wireless communication 30C with animal monitoring device 400A.

As a general summary, each of the animal monitoring devices 300/300A/300B/400/400A/400B can store sensor data, such as a list of packets, and respective transmission deadlines corresponding to the respective sensor data. When two animal monitoring devices meet, such as when they are in short-range wireless communication, the two animal monitoring devices can compare battery level parameters. The animal monitoring device with the highest battery level can receive the data from the other animal monitoring device. As discussed below, the animal monitoring device with lowest battery can clear its data and can sleep until it starts accumulating the sensor data again (such as accumulating the sensor data in form of a list). The animal monitoring device that received the data, can add the new data into its sensor data set. In one example, data of the sensor data set can be sorted with ascending transmission deadlines. Once the earliest transmission deadline is reached, data (such as all data) can be transmitted to a receiver via cellular communication. This process may be repeated when the animal monitoring device is in range with another animal monitoring device.

Accordingly, as shown in the figures, the disclosure can provide for flexible network formations for low power transfer and consolidation of data.

Figure 2:
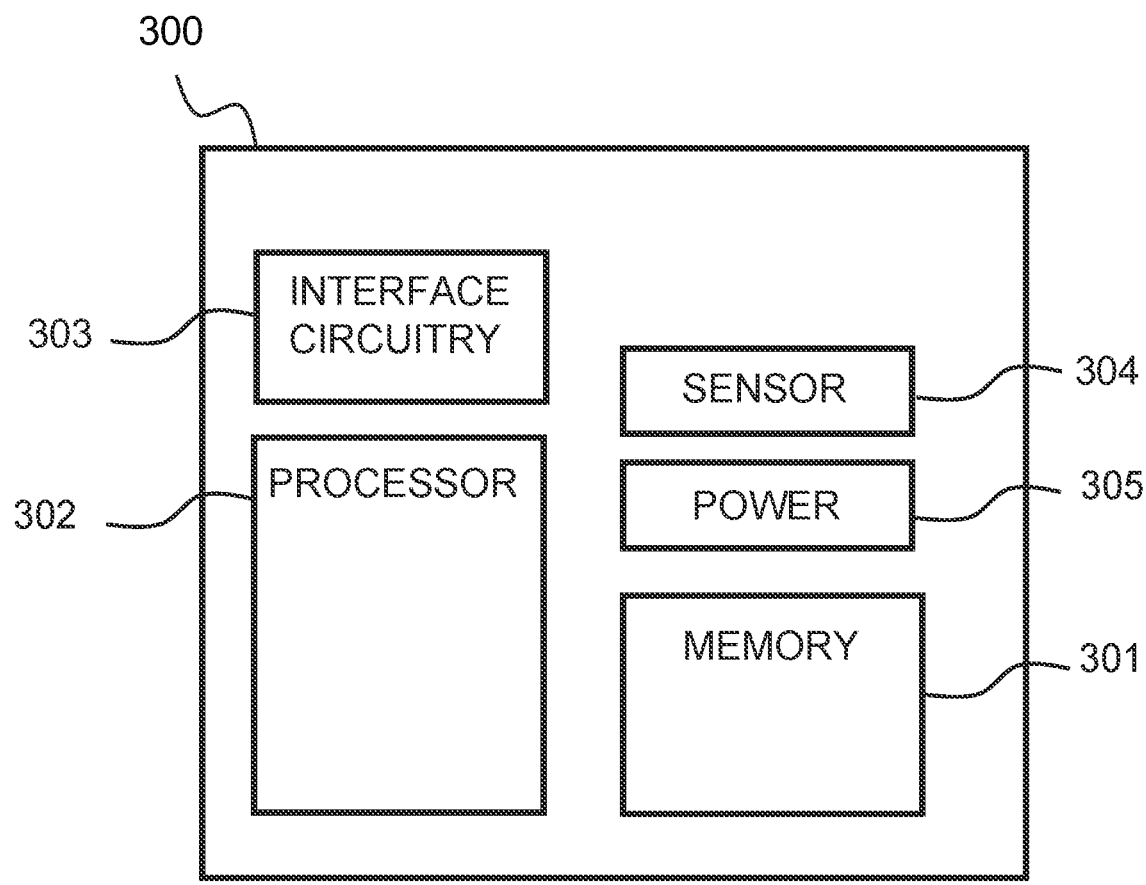
FIG. 2 is a block diagram illustrate an example animal monitoring device according to the disclosure.

FIG. 2 shows a block diagram of an example animal monitoring device 300 according to the disclosure. The animal monitoring device 300 may further be incorporated into any of the animal monitoring devices 300B/400/400A/400B discussed above. The animal monitoring device 300 can include a memory circuitry 301. The animal monitoring device 300 can include a processor circuitry 302, The animal monitoring device 300 can include an interface circuitry 303. The animal monitoring device 300 can include a first sensor 304. The animal monitoring device 300 can include a power source 305. The power source may be, for example, a battery. As shown, in one or more example animal monitoring devices, the first sensor 304 can be internal of the animal monitoring device 300.

The animal monitoring device 300 may be configured to perform any of the methods disclosed in FIG. 4A-4B below. In other words, the animal monitoring device 300 may be configured for monitoring an animal. Examples of animal monitoring devices may include an IoT device, a mobile device, a health monitoring device, and/or a tag.

The interface circuitry 303 can be configured to communicate via short-range wireless communication. The interface circuitry 303 can be configured to communicate via short-range wireless communication to a second animal monitoring device. For example, as discussed above with respect to FIG. 1A, the interface circuitry can be configured to communicate via short-range wireless communication to a second animal monitoring device (such as animal monitoring device 400 of FIGS. 1A-B). The interface circuitry 303 can be configured to communicate via cellular communication. The interface circuitry 303 can be configured to communicate via cellular communication and/or short-range wireless communication.

As discussed above, the interface 303 can be configured for wireless communications via a cellular communication, for example using a 3GPP system, such as a 3GPP system supporting one or more of: New Radio, NR, Narrow-band IoT, NB-IoT, and Long Term Evolution—enhanced Machine Type Communication, LTE-M.

The processor circuitry 302 can be configured to obtain sensor data. For example, the processor circuitry 302 can be configured to obtain (such as receive, for example via the interface circuitry 303, and/or retrieve) sensor data from a first sensor 304. The sensor data can include a first transmission deadline. The processor circuitry 302 can be configured to provide the sensor data into a sensor data set.

In one or more exemplary animal monitoring devices, the animal monitoring device may be configured to take certain actions under certain conditions. For example, when the animal monitoring device 300 is in range, such as short-range wireless communication range, such as using the short-range wireless communication, with a second animal monitoring device, the animal monitoring device 300 may be configured to take certain actions. For example, when the animal monitoring device 300 is in range, using the short-range wireless communication, with a second animal monitoring device, the animal monitoring device 300 may be configured to take certain actions.

The animal monitoring device 300 can be configured to receive, from the second animal monitoring device, a second battery parameter when the animal monitoring device 300 is in range, using the short-range wireless communication, with a second animal monitoring device. The second battery parameters can be indicative of a battery level of the second animal monitoring device. The animal monitoring device 300 can be configured to receive by using a interface circuitry 303, from the second animal monitoring device, a second battery parameter indicative.

The animal monitoring device 300 can be configured to determine if the second battery parameter satisfies a first criterion. The first criterion can be based on a first battery parameter. The first battery parameter can be indicative of a battery level of the animal monitoring device. The animal monitoring device 300 can be configured to determine, for example by using processor circuitry 302, if the second battery parameter satisfies a first criterion.

When the second battery parameter satisfies the first criterion, the animal monitoring device 300 is configured to receive via the short-range wireless communication, from the second animal monitoring device, second sensor data having a second transmission deadline. Further, the animal monitoring device 300 is configured to add the second sensor data into the sensor data set. When the second battery parameter satisfies the first criterion, the animal monitoring device 300 is configured to receive by using interface circuitry 303, via the short-range wireless communication, from the second animal monitoring device, second sensor data having a second transmission deadline.

By adding the second sensor data into the sensor data set, the animal monitoring device 300 may organize, concatenate, and/or adjust the position of the data in the sensor data set. In particular, the animal monitoring device 300 may organize the second sensor data into the sensor data set so that the earliest, or closest, transmission deadline would be read first. That way, data (such as all data) from the sensor data set can be sent once the earliest transmission deadline is reached. Thus, timeout issues for the data can be avoided.

When the second battery parameter does not satisfy the first criterion, the animal monitoring device 300 is configured to transmit data in the sensor data set via short-range wireless communication to the second animal monitoring device. This can be performed by using interface circuitry 303.

Moreover, the animal monitoring device 300 can be configured to control the transmission of data in the sensor set. For example, the animal monitoring device 300 can be configured to control the transmission, via cellular communication, of data in the sensor set. The control can be based on the first transmission deadline. The control can be based on the second transmission deadline. The control can be based on the first transmission deadline and/or second transmission deadline.

In other words, the animal monitoring device 300 is configured to control the transmission of data through the cellular communication to a receiver, such as an external device such as a radio access network node (e.g. a base station), a server device, and/or a user device.

In one or more example animal monitoring devices, the sensor data includes one or more of physiological data, heart rate data, movement data, acceleration data, and temperature data. The sensor data can include heart rate data. The sensor data can include movement data. The sensor data can include GPS data. The sensor data can include acceleration data. The sensor data can include temperature data. The particular data is not limiting, and any number of data types regarding the animal associated with the animal monitoring device can be included in the sensor data. For example, the sensor data can be indicative of a likely birthing from the animal associated with the animal monitoring device. The sensor data can be indicative of heart rate.

Accordingly, the first sensor may be any number of sensors capable of detecting the sensor data. An example first sensor can be an electronic device. The first sensor can be an accelerometer and/or a motion sensor. The first sensor can be a thermometer. The first sensor can be a heart rate sensor.

In one or more example animal monitoring devices, the first criterion is based on the first battery parameter indicative of battery level of the animal monitoring device and a margin parameter. As discussed above, the animal monitoring device can compare a first battery parameter with a second battery parameter of a second animal monitoring device. The first battery criterion can be directly indicative of a battery level of the animal monitoring device and the second battery parameter can be directly indicative of the battery level of the second animal monitoring device. Thus, the actual battery level of the two animal monitoring devices can be compared. However, it may be advantageous to provide some margin for error so that data does not transmit back and forth between two animal monitoring devices. Thus, the first criterion can be based on the first battery parameter as well as a margin parameter.

The margin parameter may be selected to avoid any looping and/or ping pong issues so that data is not sent in circuits or loops. Thus, the margin parameter may be selected so that the animal monitoring device and the second animal monitoring device do not keep passing data back and forth until their batteries are exhausted.

The margin parameter can be 1, 2, 3, 4, 5, 6, 7, 8, 9, 10, 15, 20, 25, or 30% of the battery parameter. The margin parameter can be greater than 1, 2, 3, 4, 5, 6, 7, 8, 9, 10, 15, 20, 25, or 30% of the battery parameter. The margin parameter can be thus 1, 2, 3, 4, 5, 6, 7, 8, 9, 10, 15, 20, 25, or 30% of the battery parameter. Accordingly, if the margin parameter is selected to be 10% of the battery parameter and the battery parameter is at 50%, the animal monitoring device will only be configured to receive data via short-range wireless communication if the second battery parameter is at 45% or lower. Further, the animal monitoring device will only be configured to transmit data via short-range wireless communication if the second battery parameter is at 55% or higher.

In one or more example animal monitoring devices, the first criterion is based on a threshold. In one or more example animal monitoring devices, the second battery parameter satisfies the first criterion if the second battery parameter is greater than the threshold.

In one or more example animal monitoring devices, the second battery parameter does not satisfy the first criterion if the second battery parameter is less than the threshold.

Instead of the margin parameter, the decision on whether the second battery parameter satisfies the first criterion is based on a threshold. The threshold may be set, such as by a user. Thus, data can be transmitted and/or received based on whether the second parameter is greater than or less than the threshold.

The threshold may be indicative of, for example, 10, 20, 30, 40, 50, 60, 70, 80, or 90% of battery level. The threshold may be indicative of, for example, greater than 10, 20, 30, 40, 50, 60, 70, 80, or 90% of battery level. The threshold may be indicative of, for example, less than 10, 20, 30, 40, 50, 60, 70, 80, or 90% of battery level.

As mentioned above, the animal monitoring device is configured to add the second sensor data with the sensor data in the sensor data set. In one or more exemplary animal monitoring devices, the animal monitoring device is configured to concatenate the second sensor data with the sensor data in the sensor data set. In one or more example animal monitoring devices, the animal monitoring device is configured to add the second sensor data with the sensor data in the sensor data set in ascending order of the first transmission deadline and the second transmission deadline. In one or more example animal monitoring devices, the animal monitoring device is configured to add the second sensor data with the sensor data in the sensor data set in descending order of the first transmission deadline and the second transmission deadline.

As the animal monitoring device can receive and store data from a number of different other animal monitoring devices, it can be advantageous to have an orderly procedure for storing the data in the sensor data set. Thus, the animal monitoring device may determine whether the second transmission deadline is sooner than the first transmission deadline. If the second transmission deadline is sooner, the second sensor data is added on top of the data already in the sensor data set. Thus, the data in the data sensor set will be communicated via cellular communication once the earliest transmission deadline is met.

In one or more example animal monitoring devices, in accordance with the processor circuitry determining that a priority indicator is in the sensor data set, the animal monitoring device is configured to transmit, via the cellular communication, the data in the sensor data set.

For example, there may be advantages for transmitting the data in the sensor data set via the cellular communication before any of the transmission deadlines, such as the first transmission deadline and/or the second transmission deadline, is met. If there is only one transmission deadline, the animal monitoring device may transmit the data in the sensor data set via cellular communication once that transmission deadline is met. In order to do so, a priority indicator, such as a label, data, flag, can be included in the sensor data and/or the second sensor data. Thus, when the sensor data with the priority indicator is included into the sensor data set, the processor circuitry can determine that the priority indicator is in the sensor data set. If this determination is made, the animal monitoring device can be configured to transmit, via the cellular communication, the data in the sensor data set.

The priority indicator can be used for any number of conditions that may be experienced by an animal associated with an animal monitoring device. For example, if the animal monitoring device determines that the animal is in pain and/or hurt and/or in distress, the animal monitoring device can add the priority indicator. Other situations can occur as well, for example one or more of a non-moving animal, sensor data outside of particular ranges, such as for temperature and/or acceleration, or a lost animal. Essentially, the priority indicator can set the transmission deadline to 0, such as for an immediate transfer.

In one or more example animal monitoring devices, the animal monitoring device is configured to receive, via the short-range wireless communication, the second sensor data and/or transmit, via the short-range wireless communication, the data in the sensor data set at a scheduled timeslot.

This can advantageously further reduce power usage of the animal monitoring device. Instead of the animal monitoring device continuously determining whether to transmit and/or receive data as disclosed herein, the animal monitoring device can instead be configured to transmit and/or receive the data at a particular scheduled timeslot. This can synchronize transmission and reception. The scheduled time slot can be, for example, every 10, 20, 30, 40, or 50 minutes. The schedule time slot can be every 1, 2, 3, 4, 5, 6, 7, 8, 9, 10, 11, 12, 18, or 24 hours. The scheduled time slot can be varied via a controller as needed.

The scheduled time slot(s) may be selected to avoid any looping and/or ping pong issues so that data is not sent in circuits or loops. Thus, the scheduled time slot(s) may be selected so that the animal monitoring device and the second animal monitoring device do not keep passing data back and forth until their batteries are exhausted.

In one or more example animal monitoring devices, the different monitoring devices can have synchronized clocks so that all transmissions and/or receptions occur at the scheduled timeslot. Further, the animal monitoring device can perform a receiver-initiated transfer (RIT). A receiver-initiated transfer may be seen as a transfer of data (sensor data) that is initiated by the receiver, for example to ensure that the receiver is indeed capable of receiving, for example in range. This can occur at a scheduled timeslot. The scheduled timeslot can be a scheduled time in a particular day. The scheduled timeslot can be a scheduled time in a particular set of days. The scheduled timeslot can be a time range in a particular day. Specifically, the animal monitoring device can initiate the cellular communication, which can broadcast a RIT signal. Other animal monitoring devices within range can listen, such as determine, the RIT signal and be configured to transmit their data to the animal monitoring device which is initiated the cellular communication. This animal monitoring device may confirm reception of the data received from the other animal monitoring devices.

The RIT signal can be based not only on a schedule timeslot, but also based on animal monitoring device activity. For example, the activity can be a movement-based activity. For example, when the animal monitoring device stops, the animal monitoring device can initiate the RIT signal and then schedule a cellular communication timeslot. For example, an accelerometer can be used. Alternatively, the activity can be when a number of animals each having an animal monitoring device are close to one another. For example, a body area network (BAN) sensor can be used to detect and/or determine if animals touch one another. Advantageously, this way timeslots are allocated densely for low latency, but actual use is more sparsely.

In one or more example animal monitoring devices, the animal monitoring device is configured to clear the data in the sensor data set after transmission of the data in the sensor data set and to enter a power-saving mode. Thus, after the animal monitoring device transmits its data, the animal monitoring device can clear any data in the sensor data set. This may include any transmission deadlines as well. In this manner, the animal monitoring device will not transmit redundant data. Further, by entering power-saving mode, such as sleep mode, for a given time after transmitting the overall power consumption will be reduced.

In one or more example animal monitoring devices, the animal monitoring device is configured to extend the first transmission deadline and/or the second transmission deadline in accordance with an external condition. As discussed, the first transmission deadline and/or the second transmission deadline may be used for when to transmit data in the sensor data set via cellular communication. However, the first transmission deadline and/or the second transmission deadline may be extended, thus providing a longer time between cellular communication of the data in the sensor data set.

In one or more example animal monitoring devices, the external condition is the determination that the animal monitoring device is located indoors. Buildings may negatively affect the range of cellular communication. Thus, if an animal monitoring device is located indoors, it may be prudent to delay cellular communication until the animal monitoring device is back outdoors. Specifically, the transmission deadline can be lengthened to find the optimal gateway for cellular communication. Other conditions that may affect cellular communications, such as bad weather, can also be used as the external condition.

In one or more example animal monitoring devices, the sensor data includes an animal identifier. As each animal monitoring device is associated with a particular animal, it can be advantageous to include an animal identifier with the sensor data. Thus, when the sensor data is transmitted, a user reviewing the sensor data would know from which animal the sensor data came from. The identifier may be, for example, a label, data, or flag.

In one or more example animal monitoring devices, the animal monitoring device is configured to determine, using the short-range wireless communication, if the livestock monitoring device is in range with the second livestock monitoring device.

Figure 4A:
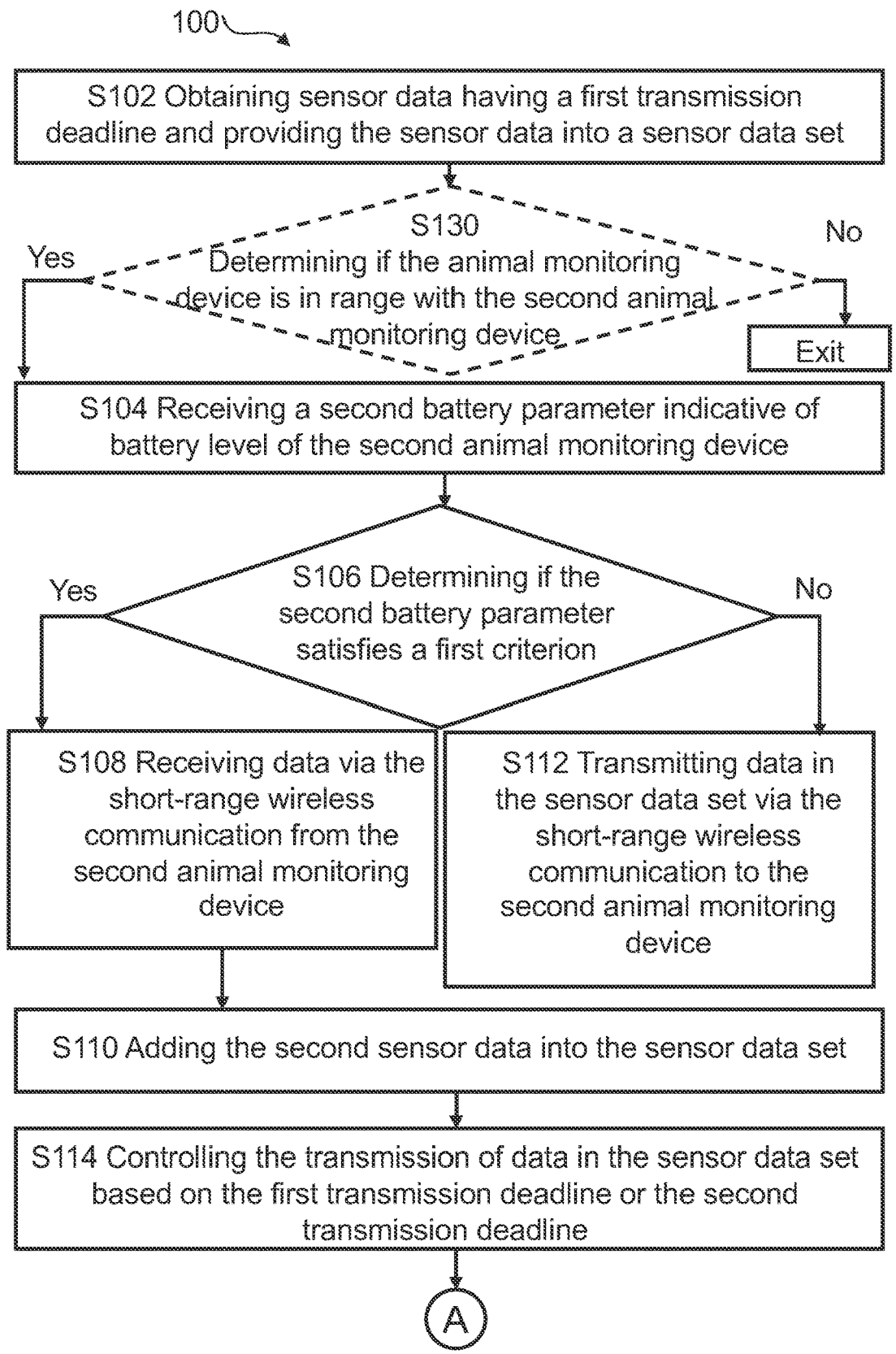
FIGS. 4A-4B are flow-charts illustrating an example method, performed in an animal monitoring device, for monitoring an animal according to this disclosure.
Figure 4B:
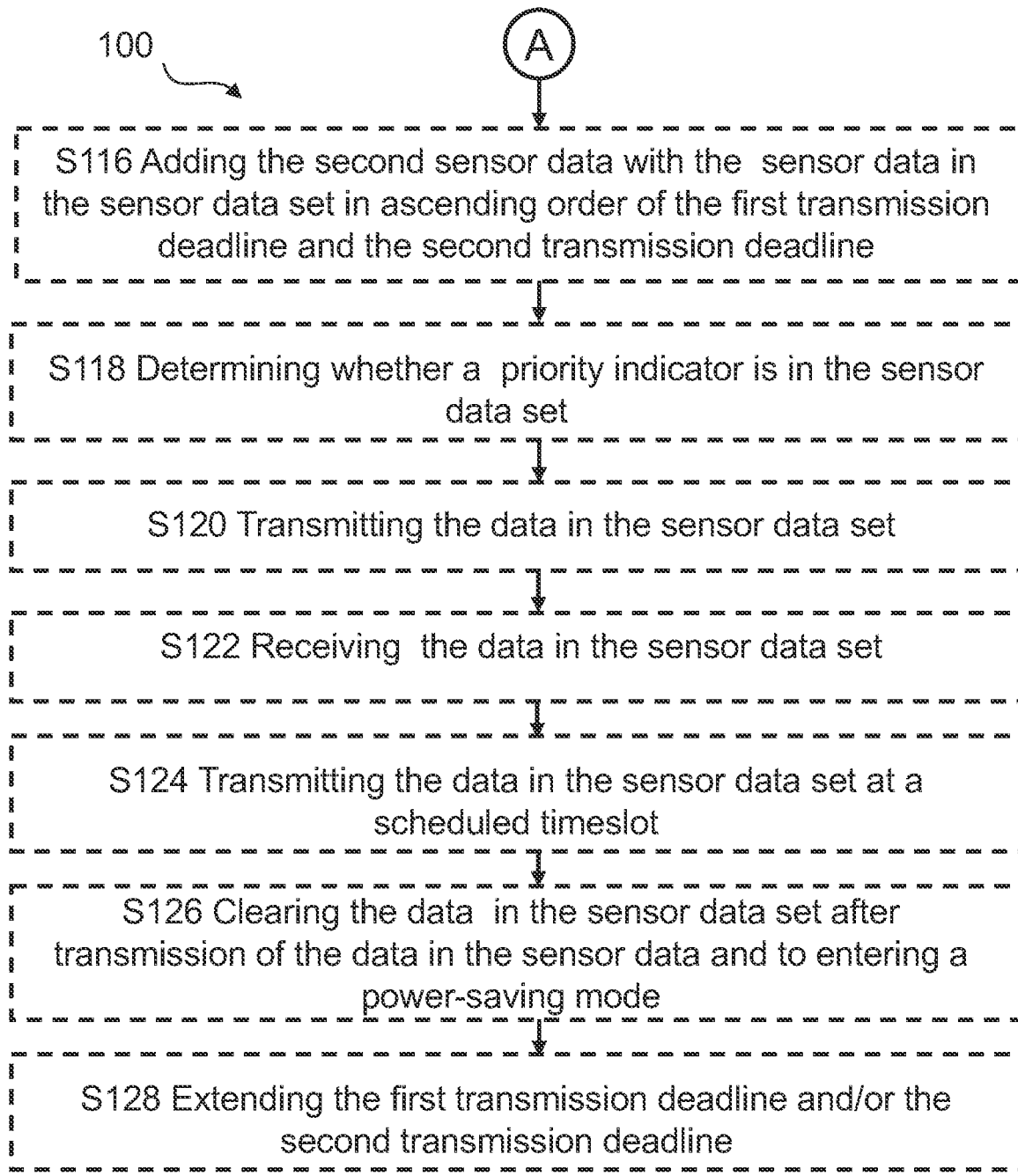

The animal monitoring device 300 is optionally configured to perform any and/or all of the operations disclosed in FIG. 4A-4B (such as any one or more of S116, S118, S120, S122, S124, S126, S128, S103, S203, S203A, S205). The operations of the animal monitoring device 300 may be embodied in the form of executable logic routines (for example, lines of code, software programs, etc.) that are stored on a non-transitory computer readable medium (for example, memory circuitry 301) and are executed by processor circuitry 302).

Furthermore, the operations of the animal monitoring device 300 may be considered a method that the animal monitoring device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry 302 also may be present (not shown in FIG. 2). Memory circuitry 301 is considered a non-transitory computer readable medium.

Memory circuitry 301 may be configured to store information such as a sensor data, a sensor dataset, and/or a battery parameter in a part of the memory.

Figure 3:
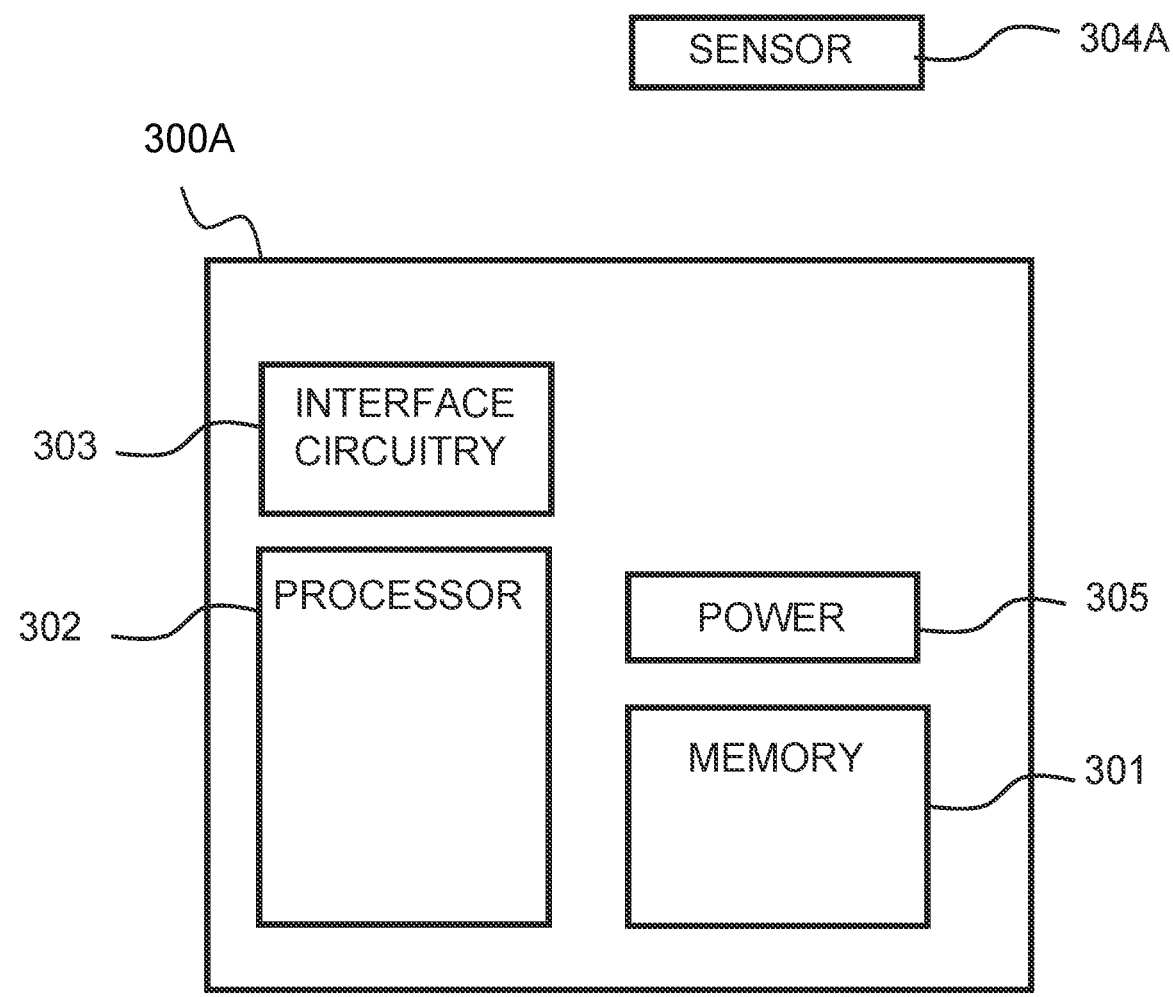
FIG. 3 is a block diagram illustrate an example animal monitoring device according to the disclosure.

FIG. 3 shows a block diagram of an example animal monitoring device 300A according to the disclosure. The animal monitoring device 300A comprises a memory circuitry 301, a processor circuitry 302, an interface circuitry 303. The animal monitoring device can also include a power source 305. The power source 305 can be, for example, a battery. As shown in FIG. 3, the animal monitoring device 300A can associated with a first sensor 304A. The first sensor 304A can be located external to the animal monitoring device 300A. Thus, the interface circuitry 303 can be configured to receive sensor data from the external first sensor 304A.

The animal monitoring device 300A may be configured to perform any of the methods disclosed in FIG. 4A-4B. In other words, the animal monitoring device 300A may be configured for monitoring an animal.

The interface circuitry 303 can be configured to communicate via short-range wireless communication to a second animal monitoring device (such as the animal monitoring device 300A) and cellular communication. The processor circuitry 302 is configured to obtain, from a first sensor, sensor data having a first transmission deadline and provide the sensor data into a sensor data set.

The animal monitoring device 300A can be configured to receive (such as by using a interface circuitry 303), from the second animal monitoring device, a second battery parameter indicative of battery level of the second animal monitoring device, when the animal monitoring device is in range, using the short-range wireless communication with the second animal monitoring device.

The animal monitoring device 300A can be configured to determine (such as by using a processor circuitry 302) if the second battery parameter satisfies a first criterion based on a first battery parameter indicative of battery level of the animal monitoring device, when the animal monitoring device is in range with the second animal monitoring device.

The animal monitoring device 300A can be configured to, when the second battery parameter satisfies the first criterion, receive (such as by using a interface circuitry 303), via the short-range wireless communication, from the second animal monitoring device (such as the animal monitoring device 300), second sensor data having a second transmission deadline.

The animal monitoring device 300A can be configured to add the second sensor data into the sensor data set, when the second battery parameter satisfies the first criterion.

The animal monitoring device 300A can be configured to, when the second battery parameter does not satisfy the first criterion, transmit (such as by using a interface circuitry 303) data in the sensor data set via short-range wireless communication to the second animal monitoring device.

The animal monitoring device 300A can be configured to control the transmission, via the cellular communication, of data in the sensor data set based on the first transmission deadline or the second transmission deadline. In other words, the animal monitoring device is configured to control the transmission of data through the cellular communication to an external device such as a radio access network node (e.g. a base station), a server device, and/or a user device.

In one or more example animal monitoring devices, the sensor data can include one or more of heart rate data, movement data, and temperature data.

In one or more example animal monitoring devices, the first sensor can be external of the animal monitoring device and in communication with the animal monitoring device.

In one or more example animal monitoring devices, the first criterion can be based on the first battery parameter indicative of battery level of the animal monitoring device and a margin parameter.

In one or more example animal monitoring devices, the first criterion can be based on a threshold. In one or more example animal monitoring devices, the second battery parameter satisfies the first criterion if the second battery parameter is greater than the threshold.

In one or more example animal monitoring devices, the second battery parameter does not satisfy the first criterion if the second battery parameter is less than the threshold.

In one or more example animal monitoring devices, the animal monitoring device can be configured to add the second sensor data with the sensor data in the sensor data set in ascending order of the first transmission deadline and the second transmission deadline.

In one or more example animal monitoring devices, in accordance with the processor circuitry determining that a priority indicator is in the sensor data set, the animal monitoring device can be configured to transmit, via the cellular communication, the data in the sensor data set.

In one or more example animal monitoring devices, the animal monitoring device can be configured to receive, via the short-range wireless communication, the second sensor data and/or In one or more example animal monitoring devices, the animal monitoring device can be configured to transmit, via the short-range wireless communication, the data in the sensor data set at a scheduled timeslot.

In one or more example animal monitoring devices, the animal monitoring device can be configured to clear the data in the sensor data set after transmission of the data in the sensor data and to enter a power-saving mode.

In one or more example animal monitoring devices, the animal monitoring device can be configured to extend the first transmission deadline and/or the second transmission deadline in accordance with an external condition.

In one or more example animal monitoring devices, the external condition can be the determination that the animal monitoring device is located indoors.

In one or more example animal monitoring devices, the sensor data can include an animal identifier.

In one or more example animal monitoring devices, the animal monitoring device is configured to determine, using the short-range wireless communication, if the livestock monitoring device is in range with the second livestock monitoring device.

The animal monitoring device 300A is optionally configured to perform any of the operations disclosed in FIG. 4A-4B (such as any one or more of S116, S118, S120, S122, S124, S126, S128, S103). The operations of the animal monitoring device 300A may be embodied in the form of executable logic routines (for example, lines of code, software programs, etc.) that are stored on a non-transitory computer readable medium (for example, memory circuitry 301) and are executed by processor circuitry 302).

Furthermore, the operations of the animal monitoring device 300A may be considered a method that the animal monitoring device 300A is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 302. Memory circuitry 301 may exchange data with processor circuitry 302 over a data bus. Control lines and an address bus between memory circuitry 301 and processor circuitry

302 also may be present (not shown in FIG. 3). Memory circuitry 301 is considered a non-transitory computer readable medium.

Memory circuitry 301 may be configured to store information such as a sensor data, a sensor dataset, and/or a battery parameter in a part of the memory.

FIGS. 4A-4B show a flow diagram of an example method 100 performed by an animal monitoring device of the disclosure for monitoring an animal. For example, the animal monitoring device 300 of FIG. 2 and/or 300A of FIG. 3, or any other animal monitoring device of the disclosure, can perform the method 100.

The method 100 can include obtaining S102, from a first sensor, sensor data having a first transmission deadline and providing the sensor data into a sensor data set.

The method 100 can include receiving S104, from the second animal monitoring device, a second battery parameter indicative of battery level of the second animal monitoring device when the animal monitoring device is in range, using the short-range wireless communication, with a second animal monitoring device.

The method 100 can include determining S106 if the second battery parameter satisfies a first criterion based on a first battery parameter indicative of battery level of the animal monitoring device when the animal monitoring device is in range with a second animal monitoring device.

The method 100 can include, when the second battery parameter satisfies the first criterion, receiving S108, via a short-range wireless communication of the animal monitoring device, from the second animal monitoring device, second sensor data having a second transmission deadline. For example S108 can occur when the animal monitoring device is in range with a second animal monitoring device and when the second battery parameter satisfies the first criterion.

The method 100 can include adding S110 the second sensor data into the sensor data set when the second battery parameter satisfies the first criterion. For example S110 can occur when the animal monitoring device is in range with a second animal monitoring device and when the second battery parameter satisfies the first criterion.

The method 100 can include, when the second battery parameter does not satisfy the first criterion, transmitting S112 data in the sensor data set via the short-range wireless communication to the second animal monitoring device. For example S112 can occur when the animal monitoring device is in range with a second animal monitoring device and when the second battery parameter does not satisfy the first criterion.

The method 100 can include controlling S114 the transmission, via a cellular communication of the animal monitoring device, of data in the sensor data set based on the first transmission deadline or the second transmission deadline.

In one or more example methods, S114 may occur when the animal monitoring device is in range with a second animal monitoring device and when the second battery parameter satisfies the first criterion.

In one or more example methods, S114 based on the first transmission deadline of the sensor data may occur when the animal monitoring device is in range with a second animal monitoring device and when the second battery parameter does not satisfy the first criterion.

In one or more example methods, the sensor data can include one or more of heart rate data, movement data, and temperature data.

In one or more example methods, the first sensor can be internal of the animal monitoring device.

In one or more example methods, the first sensor can be external of the animal monitoring device and in communication with the animal monitoring device.

In one or more example methods, the first criterion can be based on the first battery parameter indicative of battery level of the animal monitoring device and a margin parameter.

In one or more example methods, the first criterion can be based on a threshold, and wherein the second battery parameter satisfies the first criterion if the second battery parameter is greater than the threshold.

In one or more example methods, the second battery parameter does not satisfy the first criterion if the second battery parameter is less than the threshold.

In one or more example methods, the method 100 can include adding S116 the second sensor data with the sensor data in the sensor data set in ascending order of the first transmission deadline and the second transmission deadline.

In one or more example methods, the method 100 can include determining S118 whether a priority indicator is in the sensor data set. In one or more example methods, the method 100 comprises in accordance with determining that the priority indicator is in the sensor set, transmitting S120, via the cellular communication, the data in the sensor data set. In accordance with determining that the priority indicator is not in the sensor set, the method 100 can continue with the controlling S114 the transmission of data in the sensor set based on the first transmission deadline or the second transmission deadline.

In one or more example methods, the method 100 can include receiving S122, via the short-range wireless communication, the second sensor data.

In one or more example methods, the method 100 can include transmitting S124, via the short-range wireless communication, the data in the sensor data set at a scheduled timeslot.

In one or more example methods, the method 100 can include clearing S126 the data in the sensor data set after transmission of the data in the sensor data and to entering a power-saving mode.

In one or more example methods, the method 100 can include extending S128 the first transmission deadline and/or the second transmission deadline in accordance with an external condition In one or more example methods, the external condition can be the determination that the animal monitoring device is located indoors.

In one or more example methods, the sensor data can include an animal identifier.

In one or more example methods, the method 100 can include determining S103, using the short-range wireless communication, if the livestock monitoring device is in range with the second livestock monitoring device. In accordance with determining that the livestock monitoring device is in range with the second livestock range, the method 100 can proceed to step S104. In accordance with the determination that the livestock monitoring device is not in range with the second livestock range, the method 100 can proceed to exit the discussed steps. Upon exiting the method 100, the method could include controlling the transmission of data in the sensor data set based on the first transmission deadline.

Examples of methods and products (animal monitoring devices) according to the disclosure are set out in the following items:

Item 1. An animal monitoring device comprising:
    memory circuitry;

interface circuitry configured to communicate via short-range wireless communication to a second animal monitoring device and cellular communication; and processor circuitry configured to obtain, from a first sensor, sensor data having a first transmission deadline and provide the sensor data into a sensor data set;

wherein, when the animal monitoring device is in range, using the short-range wireless communication, with the second animal monitoring device, the animal monitoring device is configured to:

receive, from the second animal monitoring device, a second battery parameter indicative of battery level of the second animal monitoring device;

determine if the second battery parameter satisfies a first criterion based on a first battery parameter indicative of battery level of the animal monitoring device, when the second battery parameter satisfies the first criterion, receive, via the short-range wireless communication, from the second animal monitoring device, second sensor data having a second transmission deadline and add the second sensor data into the sensor data set; and when the second battery parameter does not satisfy the first criterion, transmit data in the sensor data set via short-range wireless communication to the second animal monitoring device; and control the transmission, via the cellular communication, of data in the sensor data set based on the first transmission deadline or the second transmission deadline.

Item 2. Animal monitoring device of Item 1, wherein the sensor data includes one or more of heart rate data, movement data, acceleration data, and temperature data.

Item 3. Animal monitoring device of Item 1 or Item 2, wherein the first sensor is internal of the animal monitoring device.

Item 4. Animal monitoring device of Item 1 or Item 2, wherein the first sensor is external of the animal monitoring device and in communication with the animal monitoring device.

Item 5. Animal monitoring device of any one of Items 1-4, wherein the first criterion is based on the first battery parameter indicative of battery level of the animal monitoring device and a margin parameter.

Item 6. Animal monitoring device of any one of Items 1-5, wherein the first criterion is based on a threshold, and wherein the second battery parameter satisfies the first criterion if the second battery parameter is greater than the threshold.

Item 7. Animal monitoring device of Item 6, wherein the second battery parameter does not satisfy the first criterion if the second battery parameter is less than the threshold.

Item 8. Animal monitoring device of any one of Items 1-7, wherein the animal monitoring device is configured to add the second sensor data with the sensor data in the sensor data set in ascending order of the first transmission deadline and the second transmission deadline.

Item 9. Animal monitoring device of any one of Items 1-8, wherein, in accordance with the processor circuitry determining that a priority indicator is in the sensor data set, the animal monitoring device is configured to transmit, via the cellular communication, the data in the sensor data set.

Item 10. Animal monitoring device of any one of Items 1-9, wherein the animal monitoring device is configured to receive, via the short-range wireless communication, the second sensor data and/or transmit, via the short-range wireless communication, the data in the sensor data set at a scheduled timeslot.

Item 11. Animal monitoring device of any one of Items 1-10, wherein the animal monitoring device is configured to clear the data in the sensor data set after transmission of the data in the sensor data and to enter a power-saving mode.

Item 12. Animal monitoring device of any one of Items 1-11, wherein the animal monitoring device is configured to extend the first transmission deadline and/or the second transmission deadline in accordance with an external condition.

Item 13. Animal monitoring device of Item 12, wherein the external condition is the determination that the animal monitoring device is located indoors.

Item 14. Animal monitoring device of any one of Items 1-13, wherein the sensor data includes an animal identifier.

Item 15. Animal monitoring device of any one of Items 1-14, wherein the animal monitoring device is configured to determine, using the short-range wireless communication, if the livestock monitoring device is in range with the second livestock monitoring device.

Item 16. A method, performed by an animal monitoring device, for monitoring an animal, the method comprising:

obtaining, from a first sensor, sensor data having a first transmission deadline and providing the sensor data into a sensor data set;

when the animal monitoring device is in range, using the short-range wireless communication, with a second animal monitoring device:

receiving, from the second animal monitoring device, a second battery parameter indicative of battery level of the second animal monitoring device;

determining if the second battery parameter satisfies a first criterion based on a first battery parameter indicative of battery level of the animal monitoring device, when the second battery parameter satisfies the first criterion, receiving, via a short-range wireless communication of the animal monitoring device, from the second animal monitoring device, second sensor data having a second transmission deadline and adding the second sensor data into the sensor data set; and when the second battery parameter does not satisfy the first criterion, transmitting data in the sensor data set via the short-range wireless communication to the second animal monitoring device; and controlling the transmission, via a cellular communication of the animal monitoring device, of data in the sensor data set based on the first transmission deadline or the second transmission deadline.

Item 17. The method of Item 16, wherein the sensor data includes one or more of heart rate data, movement data, and temperature data.

Item 18. The method of Item 16 or Item 17, wherein the first sensor is internal of the animal monitoring device.

Item 19. The method of Item 16 or Item 17, wherein the first sensor is external of the animal monitoring device and in communication with the animal monitoring device.

Item 20. The method of any one of Items 16-19, wherein the first criterion is based on the first battery parameter indicative of battery level of the animal monitoring device and a margin parameter.

Item 21. The method of any one of Items 16-20, wherein the first criterion is based on a threshold, and wherein the second battery parameter satisfies the first criterion if the second battery parameter is greater than the threshold.

Item 22. The method of Item 21, wherein the second battery parameter does not satisfy the first criterion if the second battery parameter is less than the threshold.

Item 23. The method of any one of Items 16-22, the method comprising adding the second sensor data with the sensor data in the sensor data set in ascending order of the first transmission deadline and the second transmission deadline.

Item 24. The method of any one of Items 16-23, the method comprising determining whether a priority indicator is in the sensor data set, and in accordance with determining that the priority indicator is in the sensor set, transmitting, via the cellular communication, the data in the sensor data set.

Item 25. The method of any one of Items 16-24, the method comprising receiving, via the short-range wireless communication, the second sensor data and/or transmitting, via the short-range wireless communication, the data in the sensor data set at a scheduled timeslot.

Item 26. The method of any one of Items 16-25, the method comprising clearing the data in the sensor data set after transmission of the data in the sensor data and to entering a power-saving mode.

Item 27. The method of any one of Items 16-26, the method comprising extending the first transmission deadline and/or the second transmission deadline in accordance with an external condition.

Item 28. The method of Item 27, wherein the external condition is the determination that the animal monitoring device is located indoors.

Item 29. The method of any one of Items 16-28, wherein the sensor data includes an animal identifier.

Item 30. The method of any one of Items 16-29, the method comprising determining, using the short-range wireless communication, if the livestock monitoring device is in range with the second livestock monitoring device.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1A-4B comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. An animal monitoring device comprising:
   memory circuitry;
   interface circuitry configured to communicate via short-range wireless communication to a second animal monitoring device and cellular communication; and
   processor circuitry configured to obtain, from a first sensor, sensor data having a first transmission deadline and provide the sensor data into a sensor data set;
   wherein, when the animal monitoring device is in range, using the short-range wireless communication, with the second animal monitoring device, the animal monitoring device is configured to:
      receive, from the second animal monitoring device, a second battery parameter indicative of battery level of the second animal monitoring device;
      determine if the second battery parameter satisfies a first criterion based on a first battery parameter indicative of battery level of the animal monitoring device,
      when the second battery parameter satisfies the first criterion, receive, via the short-range wireless communication, from the second animal monitoring device, second sensor data having a second transmission deadline and add the second sensor data into the sensor data set; and
      when the second battery parameter does not satisfy the first criterion, transmit data in the sensor data set via the short-range wireless communication to the second animal monitoring device; and control the transmission, via the cellular communication, of data in the sensor data set based on the first transmission deadline or the second transmission deadline.

2. The animal monitoring device of claim 1, wherein the sensor data includes one or more of heart rate data, movement data, acceleration data, and temperature data.

3. The animal monitoring device of claim 1, wherein the first sensor is internal of the animal monitoring device.

4. The animal monitoring device of claim 1, wherein the first sensor is external of the animal monitoring device and in communication with the animal monitoring device.

5. The animal monitoring device of claim 1, wherein the first criterion is based on the first battery parameter indicative of battery level of the animal monitoring device and a margin or error associated with the battery level.

6. The animal monitoring device of claim 1, wherein the first criterion is based on a threshold, and wherein the second battery parameter satisfies the first criterion if the second battery parameter is greater than the threshold.

7. The animal monitoring device of claim 6, wherein the second battery parameter does not satisfy the first criterion if the second battery parameter is less than the threshold.

8. The animal monitoring device of claim 1, wherein the animal monitoring device is configured to add the second sensor data with the sensor data in the sensor data set in ascending order of the first transmission deadline and the second transmission deadline.

9. The animal monitoring device of claim 1, wherein, in accordance with the processor circuitry determining that a priority indicator is in the sensor data set, the animal monitoring device is configured to transmit, via the cellular communication, the data in the sensor data set.

10. The animal monitoring device of claim 1, wherein the animal monitoring device is configured to receive, via the short-range wireless communication, the second sensor data and/or transmit, via the short-range wireless communication, the data in the sensor data set at a scheduled timeslot.

11. The animal monitoring device of claim 1, wherein the animal monitoring device is configured to clear the data in the sensor data set after transmission of the data in the sensor data and to enter a power-saving mode.

12. The animal monitoring device of claim 1, wherein the animal monitoring device is configured to extend the first transmission deadline and/or the second transmission deadline in accordance with an external condition.

13. The animal monitoring device of claim 12, wherein the external condition is the determination that the animal monitoring device is located indoors.

14. The animal monitoring device of claim 1, wherein the sensor data includes an animal identifier.

15. The animal monitoring device of claim 1, wherein the animal monitoring device is configured to determine, using the short-range wireless communication, if the animal monitoring device is in range with the second animal monitoring device.

16. A method, performed by an animal monitoring device, for monitoring an animal, the method comprising:

obtaining, from a first sensor, sensor data having a first transmission deadline and providing the sensor data into a sensor data set;

when the animal monitoring device is in range, using a short-range wireless communication, with a second animal monitoring device:

receiving, from the second animal monitoring device, a second battery parameter indicative of battery level of the second animal monitoring device;

determining if the second battery parameter satisfies a first criterion based on a first battery parameter indicative of battery level of the animal monitoring device, when the second battery parameter satisfies the first criterion, receiving, via the short-range wireless communication of the animal monitoring device, from the second animal monitoring device, second sensor data having a second transmission deadline and adding the second sensor data into the sensor data set; and when the second battery parameter does not satisfy the first criterion, transmitting data in the sensor data set via the short-range wireless communication to the second animal monitoring device; and controlling the transmission, via a cellular communication of the animal monitoring device, of data in the sensor data set based on the first transmission deadline or the second transmission deadline.

17. The method of claim 16, wherein the sensor data includes one or more of heart rate data, movement data, and temperature data.

18. The method of claim 16, wherein the first sensor is internal of the animal monitoring device.

19. The method of claim 16, wherein the first sensor is external of the animal monitoring device and in communication with the animal monitoring device.

20. The method of claim 16, wherein the first criterion is based on the first battery parameter indicative of battery level of the animal monitoring device and a margin of error associated with the battery level.

\* \* \* \* \*